US010812417B2

(12) United States Patent
Briggs et al.

(10) Patent No.: US 10,812,417 B2
(45) Date of Patent: Oct. 20, 2020

(54) AUTO-INCORRECT IN CHATBOT HUMAN-MACHINE INTERFACES

(71) Applicant: INTERNATIONAL BUSINESS MACHINES CORPORATION, Armonk, NY (US)

(72) Inventors: Benjamin D. Briggs, Waterford, NY (US); Lawrence A. Clevenger, Saratoga Springs, NY (US); Leigh Anne H. Clevenger, Rhinebeck, NY (US); Christoper J. Penny, Saratoga Springs, NY (US); Michael Rizzolo, Albany, NY (US); Aldis Sipolins, New York City, NY (US)

(73) Assignee: International Business Machines Corporation, Armonk, NY (US)

( * ) Notice: Subject to any disclaimer, the term of this patent is extended or adjusted under 35 U.S.C. 154(b) by 184 days.

(21) Appl. No.: 15/865,530

(22) Filed: Jan. 9, 2018

(65) Prior Publication Data

US 2019/0215282 A1 Jul. 11, 2019

(51) Int. Cl.
*G06F 17/28* (2006.01)
*H04L 12/58* (2006.01)
*H04L 29/08* (2006.01)
*G06N 20/00* (2019.01)
*G06F 40/253* (2020.01)

(52) U.S. Cl.
CPC ............ *H04L 51/02* (2013.01); *G06F 40/253* (2020.01); *G06N 20/00* (2019.01); *H04L 67/306* (2013.01)

(58) Field of Classification Search
CPC ..... H04L 51/02; H04L 67/306; G06F 17/274; G06N 20/00

USPC .......................................... 709/205, 206, 207
See application file for complete search history.

(56) References Cited

U.S. PATENT DOCUMENTS

| 10,601,740 | B1 * | 3/2020 | Harding | .................. | H04L 67/10 |
| 10,635,751 | B1 * | 4/2020 | Relangi | ................. | G06F 40/295 |
| 2003/0187925 | A1 | 10/2003 | Inala et al. | | |
| 2005/0105712 | A1 * | 5/2005 | Williams | .............. | G10L 13/027 |
| | | | | | 379/265.02 |
| 2009/0292778 | A1 | 11/2009 | Makar et al. | | |
| 2011/0213642 | A1 | 9/2011 | Makar et al. | | |
| 2012/0215560 | A1 * | 8/2012 | Ofek | ...................... | G16H 10/60 |
| | | | | | 705/3 |

(Continued)

OTHER PUBLICATIONS

Marino "The Racial Formation of Chatbots," CLCWeb: Comparative Literature and Culture, Dec. 2014, vol. 16 Issue 5 Article 13, Purdue University Press, http://docs.lib.purdue.edu/clcweb/vol16/iss5/13.

(Continued)

*Primary Examiner* — Thu Ha T Nguyen
(74) *Attorney, Agent, or Firm* — Samuel A. Waldbaum (57) ABSTRACT

Context appropriate errors are injected into conversational text generated by conversational agents. The conversational agent creates an imperfect conversational text containing at least one text entry error added to the original conversational text. A confidence level that at least one of context and meaning of the imperfect conversational text is consistent with the context and meaning of the original conversational text is determined, and the imperfect conversational text is communicated to a human recipient if the confidence level is above a pre-defined threshold.

20 Claims, 4 Drawing Sheets

(56) References Cited

U.S. PATENT DOCUMENTS

| | | |
|---|---|---|
| 2014/0279050 A1 | 9/2014 | Makar et al. |
| 2015/0286632 A1* | 10/2015 | Meunier ............... G06F 40/51 704/2 |
| 2017/0206064 A1* | 7/2017 | Breazeal ............... G06F 8/36 |
| 2017/0242886 A1* | 8/2017 | Jolley ............... G06F 40/205 |
| 2017/0242899 A1* | 8/2017 | Jolley ............... G06F 3/0485 |
| 2017/0243107 A1* | 8/2017 | Jolley ............... G06N 5/02 |
| 2017/0330195 A1* | 11/2017 | Lange ............... G06F 3/0486 |
| 2017/0344532 A1* | 11/2017 | Zhou ............... G06F 40/56 |
| 2018/0329993 A1* | 11/2018 | Bedadala ............... G06F 16/24522 |
| 2018/0357221 A1* | 12/2018 | Galitsky ............... G06F 40/205 |
| 2019/0034976 A1* | 1/2019 | Hamedi ............... G06Q 30/0244 |
| 2019/0073602 A1* | 3/2019 | Willner ............... G06N 5/048 |
| 2019/0082239 A1* | 3/2019 | Webster ............... H04N 21/4858 |
| 2019/0102078 A1* | 4/2019 | Bhatt ............... G06F 3/04847 |
| 2019/0103111 A1* | 4/2019 | Tiwari ............... G06F 16/3334 |
| 2019/0124020 A1* | 4/2019 | Bobbarjung ............... G06Q 20/123 |
| 2019/0236134 A1* | 8/2019 | Galitsky ............... G06F 16/35 |
| 2019/0260694 A1* | 8/2019 | Londhe ............... G06N 5/04 |
| 2019/0286713 A1* | 9/2019 | Terry ............... H04L 51/02 |
| 2019/0312973 A1* | 10/2019 | Engelke ............... G10L 15/183 |
| 2019/0313230 A1* | 10/2019 | MacGabann ............... H04L 67/18 |
| 2019/0370615 A1* | 12/2019 | Murphy ............... G06Q 10/0633 |
| 2020/0097597 A1* | 3/2020 | Lourentzou ............... G06N 3/0481 |
| 2020/0117858 A1* | 4/2020 | Freeman ............... G06F 40/117 |
| 2020/0126226 A1* | 4/2020 | Adiri ............... G06T 5/007 |
| 2020/0126227 A1* | 4/2020 | Adiri ............... G06K 9/4652 |
| 2020/0143115 A1* | 5/2020 | Brigham ............... G06F 40/295 |
| 2020/0143247 A1* | 5/2020 | Jonnalagadda ............... G06N 3/0454 |
| 2020/0159778 A1* | 5/2020 | Mohanty ............... G06F 16/90332 |

OTHER PUBLICATIONS

Sundar et al., "Theoretical Importance of Contingency in Human-Computer Interaction: Effects of Message Interactivity on User Engagement," Communication Research, published online May 22, 2014, SAGE.

* cited by examiner

AUTO-INCORRECT IN CHATBOT HUMAN-MACHINE INTERFACES

FIELD OF THE INVENTION

The present invention relates to conversational agents and natural language understanding.

BACKGROUND OF THE INVENTION

Virtual interactive conversational agents, which are commonly referred to as chatbots, are used with increasing frequency, for example, to interact with customers. Available frameworks for constructing conversational agents make the creation of conversational agents easy, increasing the rate of creation of conversational agents and allowing the creation of conversational agents by programmers that are not experts in artificial intelligence.

Some conversational agents communicate or interact using either text commands or voice commands. Other conversational agents utilize the content of a natural language conversation. Text that is generated by conversational agents, however, can be noticeably unnatural and formal. The conversational agent typically uses a pre-determined format and tone. Conversational agents so not make mistakes or use slang or colloquialisms. In addition, conversation agents are not actually entering text into a device such as a smart phone with a virtual keyboard. Therefore, the text generated by conversational agents will not have typing errors, spelling errors and formatting errors associated with text entered by a human. The lack of informalities and errors yields a text that is noticeably machine generated.

SUMMARY OF THE INVENTION

Exemplary embodiments are directed to systems and methods that provide conversational agent produced text, i.e., machine generated text, for conversations that more effectively and closely resembles and mimics conversational text that is generated by a human and entered in real time. The system determines factors that contribute to errors and styles that are indicative of a human text entry using, for example, a virtual keyboard on a smart phone, and can be associated with particular groups of humans. In one embodiment, artificial intelligence (AI) is used to determine the factors that contribute to these errors and styles and to identify the errors and styles. The system also determines the acceptability to the recipient to receiving text incorporating any given error or style and confidence level of an appropriateness of the error or style incorporated into the text and of maintaining an original meaning of the conversational text given the incorporated textual errors.

Exemplary embodiments are directed to a method for injecting context appropriate errors into conversational text generated by conversational agents. A conversational agent is used to create from an original conversational text an imperfect conversational text containing at least one text entry error added to the original conversational text. A confidence level that at least one of context and meaning of the imperfect conversational text is consistent with the context and meaning of the original conversational text is determined, and the imperfect conversational text is communicated to a human recipient if the confidence level is above a pre-defined threshold.

Exemplary embodiments are also directed to a computer-readable medium containing a computer-readable code that when read by a computer causes the computer to perform a method for injecting context appropriate errors into conversational text generated by conversational agents. A conversational agent is used to create from an original conversational text an imperfect conversational text containing at least one text entry error added to the original conversational text. A confidence level that at least one of context and meaning of the imperfect conversational text is consistent with the context and meaning of the original conversational text is determined, and the imperfect conversational text is communicated to a human recipient if the confidence level is above a pre-defined threshold.

Exemplary embodiments are directed to a system for injecting context appropriate errors into conversational text generated by conversational agents. The system includes a database storing user profiles for human recipients. Each user profile includes an acceptability of a human recipient to changes in at least one of context and meaning related to specific text entry errors found in conversational text. A conversational agent executes on a computing system. The conversational agent generates and exchanges conversational text with human recipients. The conversational agents includes a text error injection module to create from an original conversational text an imperfect conversational text containing at least one text entry error added to the original conversational text, a natural language processing module in communication with the text error injection module and the database to determine a confidence level that at least one of context and meaning of the imperfect conversational text is consistent with the context and meaning of the original conversational text based on the acceptability of a given human recipient to changes in at least one of the context and the meaning related to text entry errors as provided in the user profile associated with the given human recipient and an input and output module executing on the computing system and in communication with the text error injection module and natural language processing module to communicate the imperfect conversational text to the given human recipient if the confidence level is above a pre-defined threshold.

DETAILED DESCRIPTION

Exemplary embodiments provide for improved and more realistic exchange of conversational text between a conversational agent and human recipients. As used herein, conversational agent includes chatbot, talkbot, chatterbot, Bot, instant messaging (IM) bot and an interactive agent. In general, a conversational agent is a software program executing on a computing system to create a dialogue system that conducts conversations or interactions between the computing system and a user, i.e., a human. Each conversation is conducted in accordance with a conversational flow specification of the conversational agent as embodied in the software program. Suitable conversational agents include, but are not limited to, the Watson Conversation agent, which is commercially available from International Business Machines Corporation of Armonk, N.Y.

In general, a dialogue system and conversation agent receive inputs from a user and provide outputs to a user using, for example, text. speech. graphics, haptics and gestures and other modes for communication on both the input and output channel. Input speech is typically in the form of commands or sentences spoken in a natural language format or entered as text using keyboards or virtual keyboards. Therefore, the dialogue system and conversational agent utilize a natural language understanding and processing engine to process conversational inputs received from human participants and to create and deliver conversational text to human recipients. To make conversational text appear more natural or to appear as if generated or entered by a human, the original conversational text is modified to an imperfect conversational text that includes one or more errors, for example, typographical errors. The errors are evaluated by the conversational agent using natural language processing to establish a confidence level that the errors do not change the context or meaning of the original conversation text. The confidence level is preferably specific to a given intended human recipient based, for example, on the dialect and cultural qualities of that intended human recipient.

Figure 1:
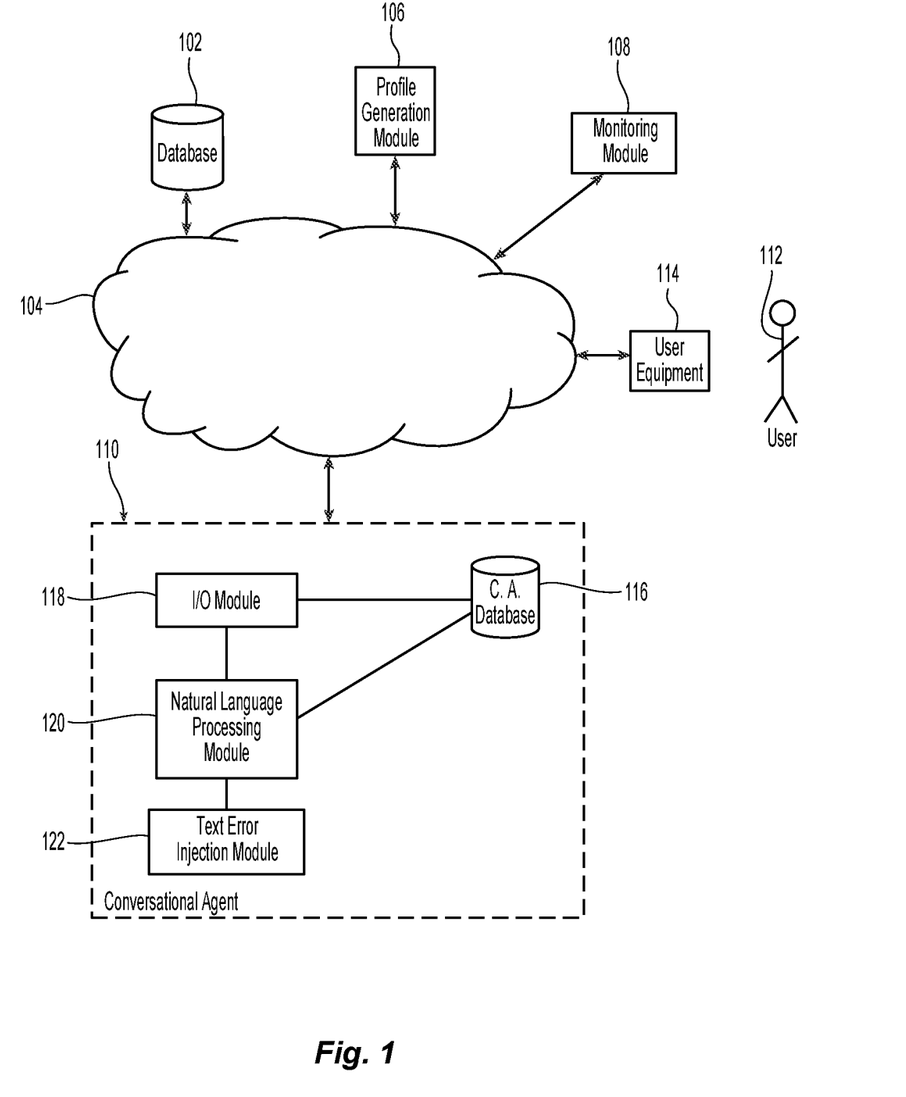
FIG. 1 is a schematic representation of an embodiment of a system for injecting context appropriate errors into conversational text generated by conversational agents.

Referring initially to FIG. 1, an embodiment of a system for injecting context appropriate errors into conversational text generated by conversational agents 100 is illustrated. The system is executing on at least one computing system and includes at least one database 102. Suitable computing systems include stand along computing systems, server networks and distributed computing systems. The computational, storage and communication requirements of the dialogue system and conversational agent are facilitated by software stored on one or more databases, and instances of that software executing on one or more components of the computing system. The software instances provide, for example, the various modules and engines of the conversational agent and for the system of injecting context appropriate errors into conversational text generated by conversational agents. All the components of the system are in communication across one or more local or wide area networks 104.

In one embodiment, the database or databases contained within the system store the software that provides the desired functionality of the system for injecting context appropriate errors into conversational text generated by conversational agents. In addition, the database stores a plurality of user profiles for a plurality of human users of the dialogue system. The human users are the human recipients of conversational text generated by the conversational agent. Each user profile includes or expresses an acceptability of a given human recipient to changes in at least one of the context and the meaning related to or caused by specific text entry errors found in conversational text. The acceptability of a given human recipient can be based on cultural and demographic differences of the human. The acceptability can change over time and can also be specific to a particular type of error, e.g., misspelling versus contextual errors. The acceptability can express how accepting a given human recipient is to a particular type of text error. In addition, the acceptability can express how likely a given human is to understand or comprehend the context and the meaning of the conversational text having one or more text errors.

The system also includes a user profile generation module 106 in communication with the database. The user profile generation module generates and maintains the user specific profiles for a plurality of users. In one embodiment, the user profile generation module maintains generic user profiles, based, for example, on age, demographics, culture, language and dialect. In one embodiment, the user profile generation module uses at least one of previous conversational agent generated text, previous human recipient generated text, human recipient demographic data, human recipient cultural data and human recipient feedback to generate the user profiles for the human participants and recipients of conversational agent generated text.

As the profile associated with a given human can develop and change over time and the tolerance of a given human to receiving conversational text containing errors is used in formulating the acceptability for the given human, a monitoring module 108 is provided that is executing on the computing system. The monitoring module is in communication with the database and can monitor conversational text exchanges between the conversational agent and human recipients. The monitoring module monitors a reaction by the given human recipient to the communicated conversational text. The monitoring module measures the engagement by the human recipient in the conversation, the tone of the human recipient and the outcome produced by the conversational text communicated to the human recipient. The monitored reaction is used to update the user profile. In addition, the monitored reaction can be used to generate an immediate response, for example, the communication of conversational text without an error, when the monitored reaction indicates a strong negative response or a lack of understanding by the human recipient.

The system includes a conversational agent 110. The conversational agent conducts conversations with one or users 112, i.e., human recipients, by exchanging conversational text in accordance with conversational flow specifications. Each conversation flow specification prescribes operation of the conversational agent and includes actions to be taken, inputs triggering actions, e.g., inputs received from a user of the conversational agent, and input confirmations executed after receipt of a given input and before triggering a given action. The actions, inputs and input confirmations can be grouped into a plurality of execution sequences, and each execution sequence defines a conversational flow path through the conversational flow specification. The conversational flow paths are used by the conversational agent to generate conversational text that is to be delivered to a human recipient. The conversational text is delivered to the human recipient through user equipment 114. This equipment is also used to communicated text from the user to the conversational agent. Suitable user equipment includes, but is not limited to, a computer, tablet computer and smartphone. In one embodiment, the conversational agent is executing an instance of the conversational flow specification that is stored in the database 106 outside the conversational agent or on a conversational agent specific database 116 within the dialogue system and conversational agent.

The conversational agent includes or is in communication with the modules and engines that provide for the injection of text errors into conversational text communicated to human recipients. These injected text errors are used to mimic human generated and entered conversational text. The conversational agent can create or mimic any type of mistake in the entry and exchange of text that is common in conversational text exchanges between humans. These mistakes or text errors include, but are not limited to, typographical errors, misspellings, abbreviations, colloquialisms, grammatical errors and a context errors. In addition, the conversational agent can mimic corrective actions such as sending original conversational text without errors upon an indication from the human recipient that the imperfect conversational text was not understood and sending a subsequent text containing just a single word when the imperfect conversational text contained a misspelling of that word.

In one embodiment, to provide imperfect conversational text that mimics actual human entered text, the conversational agent includes a text error injection module 122 to create from an original conversational text an imperfect conversational text. The original conversational text does not contain errors and is in keeping with the current conversational flow path. The imperfect conversational text includes at least one text entry error added to the original conversational text or that results from a modification of the original conversational text. The conversational agent also includes a natural language processing module 120 in communication with the text error injection module and the database 116, 106 to determine a confidence level that at least one of the context and the meaning of the imperfect conversational text is consistent with the context and the meaning of the original conversational text. Preferably, the determination of the confidence level is based on the acceptability of a given human recipient to changes in at least one of the context and the meaning related to text entry errors as provided in the user profile associated with the given human recipient. In one embodiment, the confidence level is a normalized confidence level having a value between 0 and 1. Any suitable natural language processing module known and available in the art can be used to determine the confidence level, for example, Watson Natural Language processing from the Watson Conversation agent.

The conversation agent also includes an input and output module 118 executing on the computing system and in communication with the text error injection module and natural language processing module to communicate the imperfect conversational text to the given human recipient if the confidence level is above a pre-defined threshold. In one embodiment, this pre-defined threshold expresses a confidence level of at least about 75%, i.e., 0.75, preferably at least about 90%, i.e., 0.9. In one embodiment, the input and output module communicates the imperfect conversational text when the confidence level is below the threshold level, and then communicates the original conversational text upon an indication that the human recipient did not understand the imperfect conversational text or responded negatively to the imperfect conversational text.

Figure 2:
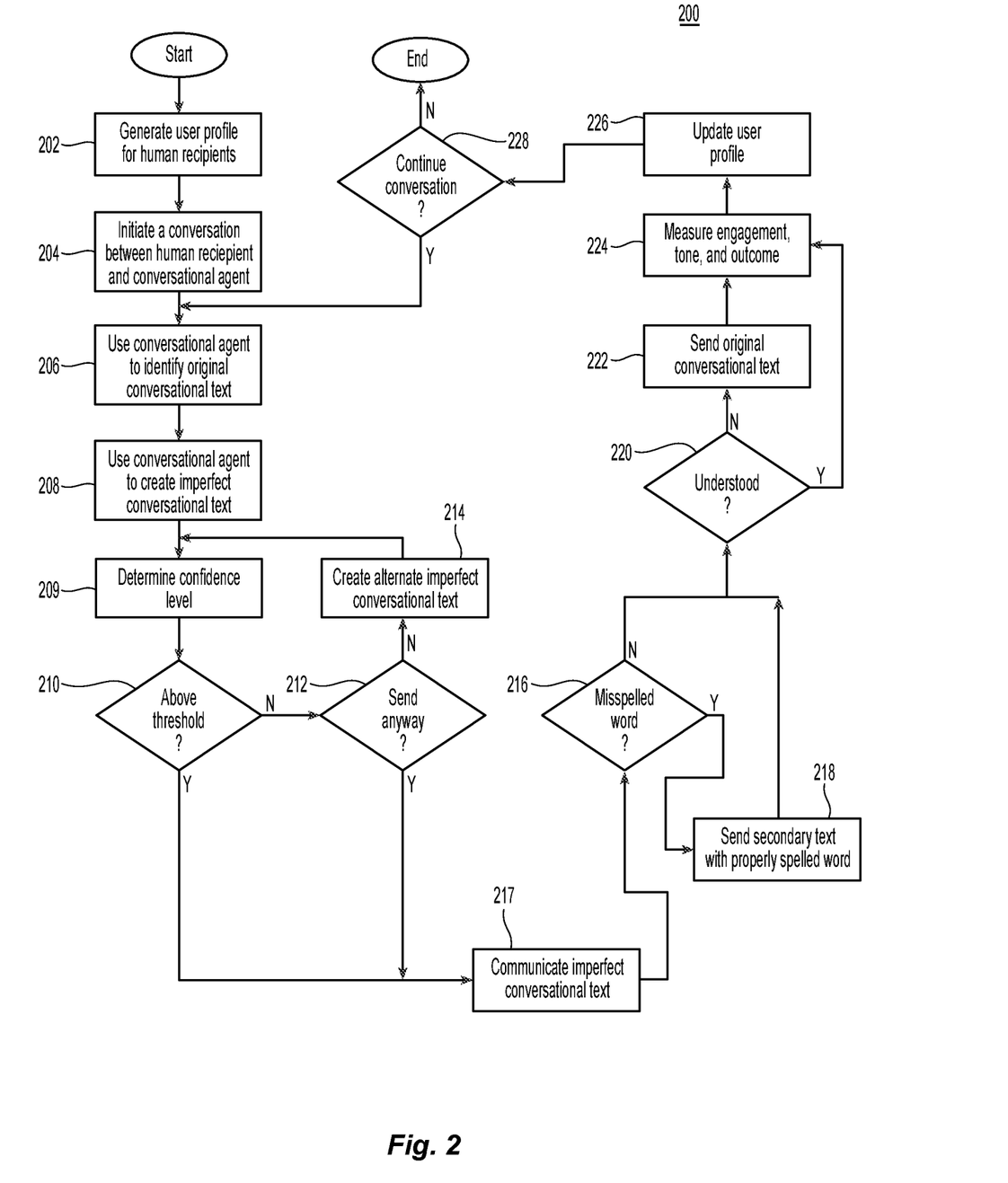
FIG. 2 is a flow chart illustrating an embodiment of a method for injecting context appropriate errors into conversational text generated by conversational agents.

Referring now to FIG. 2, exemplary embodiments are directed to a method for injecting context appropriate errors into conversational text generated by conversational agents 200. A user profile for at least one and preferably a plurality of human participants, i.e., human recipients of conversational agent generated conversational text, in a conversation with a conversational agent is generated 202. Each user profile expresses an acceptability of a given human recipient to changes in at least one of context and meaning related to specific text entry errors in communicated conversation text. Suitable text entry errors include, but are not limited to, typographical errors, misspellings, abbreviations, colloquialisms, grammatical errors, context errors and combinations thereof. In one embodiment, machine learning is used to generate, maintain and update the user profiles. In in embodiment, at least one of previous conversational agent generated text, previous human recipient generated text, human recipient demographic data, human recipient cultural data and human recipient feedback is used to generate the user profile.

A conversation is initiated between a human recipient and a conversational agent 204. The conversational agent is used to identify original conversational text to be communicated to the human recipient 206. The conversational agent is used to create from an original conversational text an imperfect conversational text 208. The imperfect conversational text includes at least one text entry error added to the original conversational text. In one embodiment, the imperfect conversational text includes a plurality of text entry errors. A confidence level that at least one of the context and the meaning of the imperfect conversational text is consistent with the context and the meaning of the original conversational text is determined 209, for example using the conversational agent. In one embodiment, a normalized confidence level is determined between 0 and 1. In one embodiment, a natural language processing system is used to analyze the imperfect conversational text. For example, the imperfect conversational text is compared to the original conversational text to determine the confidence level. In one embodiment, at least one of dialect and cultural qualities associated with the human recipient are used to determine if at least one of the context and the meaning is consistent. In one embodiment, the confidence level is determined based on the acceptability of the human recipient to changes in at least one of context and meaning related to text entry errors as provided in the user profile.

The determined confidence level is then compared to a pre-defined threshold level to see if the confidence level is above the pre-defined threshold level 210. In one embodiment, the pre-defined threshold level is associated with a confidence level of about 90%. Alternatively, the pre-determined threshold is associated with a confidence level of less than about 90%, for example, 70%, 50%, 30% or 10%. If the confidence level is not above the pre-defined confidence level, then a determination is made regarding whether to send the imperfect text 212 even though the confidence level is below the predefined threshold. If the imperfect conversational text is not to be communicated anyway, an alternate imperfect conversational text is generated 214 with at least one alternate text entry error. A new confidence level is then generated for the alternative imperfect conversational text, and that new confidence level is checked against the threshold. This process is repeated until the desired confidence level is achieved or the imperfect conversational text is sent anyway.

If the imperfect conversational text is sent anyway or if the confidence level is above a pre-defined threshold the imperfect conversational text is communicated to a human recipient 217. A determination is then made regarding whether the text entry error includes or is only the misspelling of a given word or single word within the conversation text 216. If a misspelled word is included in the imperfect conversational text, then a secondary conversational text is sent to the human recipient 218 after the imperfect conversational text. In one embodiment, the secondary conversational text is sent immediately, before any response or reply from the human recipient. The secondary conversation text contains only the given word properly spelled. Therefore, the conversational agent mimics the action of a human that notices a misspelling in a conversational text communication and immediately sends a correction for the misspelled word. In one embodiment, the method does not include a check for misspelled words and a subsequent communication of properly spelled words.

A determination is then made regarding whether the human recipient understood the communicated imperfect conversational text 220. For example, the conversational agent can receive a reply conversational text from the human recipient indicating a failure to comprehend the imperfect conversational text, i.e., a text response "?", "What?", "Please clarify". In one embodiment, if the imperfect conversational text was not understood, the original conversational text is communicated to the human recipient 222. Therefore, the conversational agent mimics the correction of conversational text by a human upon an indication that the originally sent text was not understood. An overall reaction by the human recipient to the communicated conversational text is then monitored 224. This reaction includes measuring an engagement by the human recipient, determining the tone of the human recipient and determining an outcome from communicating the imperfect conversational text. The monitored reaction is used to update the user profile 226. A determination is then made regarding whether to continue the conversation 228. If the conversation is to be continued, then the conversational agent again identifies an appropriate original conversational text and repeats the process of inserting text entry errors.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although a detailed description on cloud computing is provided, implementation of the teachings provided herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources, e.g., networks, network bandwidth, servers, processing, memory, storage, applications, virtual machines, and services, that can be rapidly provisioned and released with minimal management effort or interaction with a provider of the service.

This cloud model may include at least five characteristics, at least three service models, and at least four deployment models. The five characteristics are on-demand self-service, broad network access, resource pooling, rapid elasticity and measured service. Regarding on-demand self-service, a cloud consumer can unilaterally provision computing capabilities, such as server time and network storage, as needed automatically without requiring human interaction with the service's provider. Broad network access refers to capabilities that are available over a network and accessed through standard mechanisms that promote use by heterogeneous thin or thick client platforms, e.g., mobile phones, laptops, and PDAs. For resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction, e.g., country, state, or datacenter. Rapid elasticity refers to capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. For measured service, cloud systems automatically control and optimize resource use by leveraging a metering capability at some level of abstraction appropriate to the type of service, e.g., storage, processing, bandwidth, and active user accounts. Resource usage can be monitored, controlled, and reported, providing transparency for both the provider and consumer of the utilized service.

The three service models are Software as a Service (SaaS), Platform as a Service (PaaS) and Infrastructure as a Service (IaaS). Software as a service provides the capability to the consumer to use the provider's applications running on a cloud infrastructure. The applications are accessible from various client devices through a thin client interface such as a web browser, e.g., web-based e-mail. The consumer does not manage or control the underlying cloud infrastructure including network, servers, operating systems, storage, or even individual application capabilities, apart from limited user-specific application configuration settings. Platform as a service provides the capability to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a service provides the capability to the consumer to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components, e.g., host firewalls.

The Deployment Models are private cloud, community cloud, public cloud and hybrid cloud. The private cloud infrastructure is operated solely for an organization. It may be managed by the organization or a third party and may exist on-premises or off-premises. The community cloud infrastructure is shared by several organizations and supports a specific community that has shared concerns, e.g., mission, security requirements, policy, and compliance considerations. It may be managed by the organizations or a third party and may exist on-premises or off-premises. The public cloud infrastructure is made available to the general public or a large industry group and is owned by an organization selling cloud services. The hybrid cloud infrastructure is a composition of two or more clouds (private, community, or public) that remain unique entities but are bound together by standardized or proprietary technology that enables data and application portability, e.g., cloud bursting for load-balancing between clouds.

Figure 3:
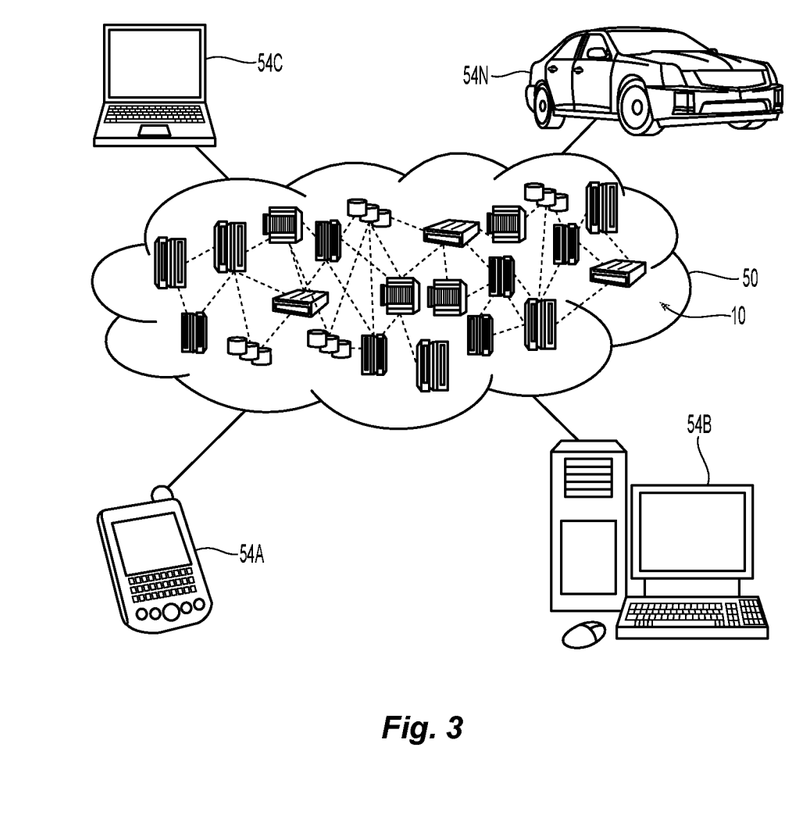
FIG. 3 depicts a cloud computing environment according to an embodiment of the present invention.

A cloud computing environment is service oriented with a focus on statelessness, low coupling, modularity, and semantic interoperability. At the heart of cloud computing is an infrastructure that includes a network of interconnected nodes. Referring now to FIG. 3, an illustrative cloud computing environment 50 is depicted. As shown, the cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection, e.g., using a web browser.

Figure 4:
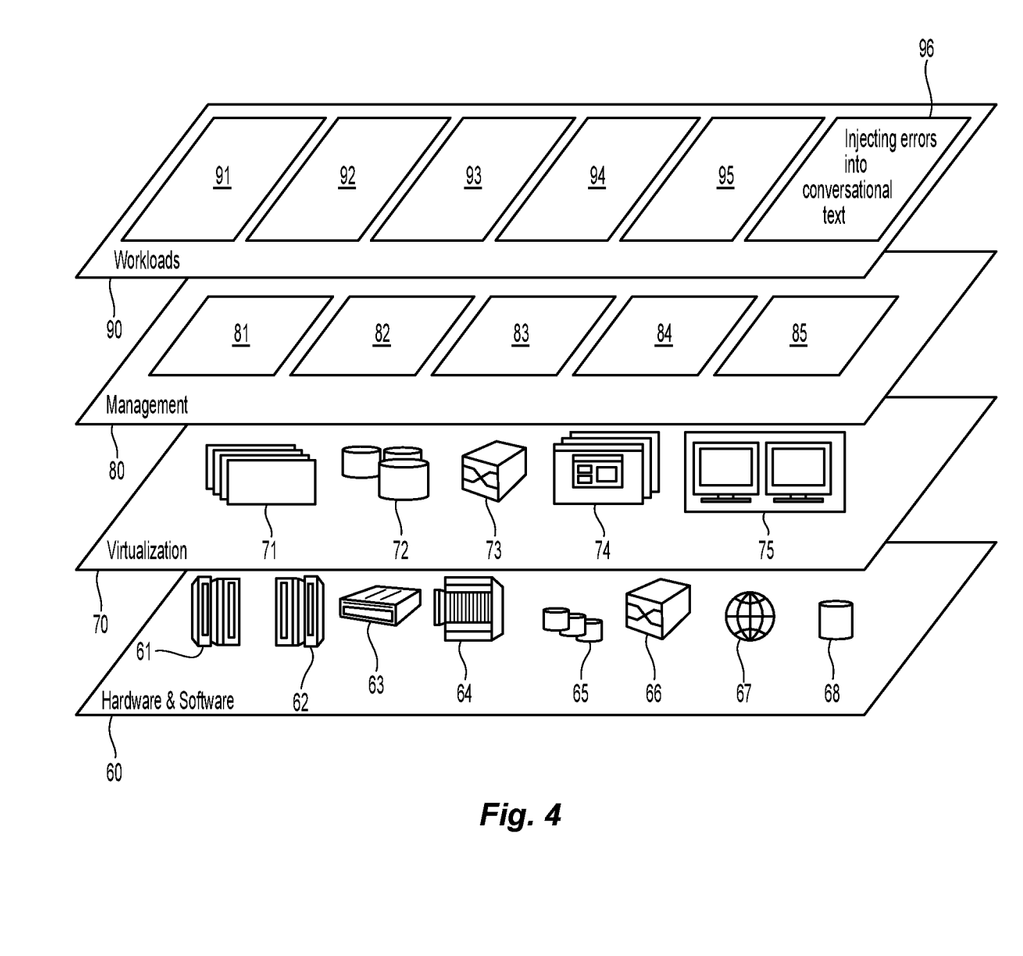
FIG. 4 depicts abstraction model layers according to an embodiment of the present invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided. A hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. A virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and injecting context appropriate errors into conversational text 96.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for injecting context appropriate errors into conversational text generated by conversational agents and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for injecting context appropriate errors into conversational text generated by conversational agents, the method comprising:

a conversational agent receiving an original conversational text;

using the conversational agent to modify original conversational text to create an imperfect conversational text, wherein the modifying the original conversational text includes adding at least one text error to the conversational text;

determining a confidence level that at least one of context and meaning of the imperfect conversational text is consistent with the context and meaning of the original conversational text; and communicating the imperfect conversational text to a human recipient if the confidence level is above a pre-defined threshold.

2. The method of claim 1, wherein the text entry error comprises a typographical error, a misspelling, an abbreviation, a colloquialism, a grammatical error, a context error or combinations thereof.

3. The method of claim 1, wherein the pre-defined threshold level comprises a confidence level of about 90%.

4. The method of claim 1, wherein determining the confidence level comprises using a natural language processing system to analyze the imperfect conversational text.

5. The method of claim 4, wherein analyzing the imperfect conversational text comprises comparing the original conversational text with the imperfect conversational text.

6. The method of claim 1, wherein determining the confidence level comprises using dialect and cultural qualities associated with the human recipient in determining if at least one of the context and meaning is consistent.

7. The method of claim 1, wherein the method further comprises creating an alternate imperfect conversational text comprising at least one alternative text entry error when the confidence level is below the pre-defined threshold.

8. The method of claim 1, wherein the method further comprises:

receiving at the conversational agent a reply conversational text from the human recipient indicating a failure to comprehend the imperfect conversational text; and communicating the original conversational text to the human recipient.

9. The method of claim 1, wherein:

the text entry error comprises a misspelling of a given word; and the method further comprises sending a secondary conversational text to the human recipient after the imperfect conversational text, the secondary conversation text comprising only the given word properly spelled.

10. The method of claim 1, wherein the method further comprises generating a user profile for the human recipient comprising an acceptability of the human recipient to changes in at least one of context and meaning related to specific text entry errors.

11. The method of claim 10, wherein generating the user profile comprises using machine learning.

12. The method of claim 10, wherein generating the user profile comprises using at least one of previous conversational agent generated text, previous human recipient generated text, human recipient demographic data, human recipient cultural data and human recipient feedback to generate the user profile.

13. The method of claim 10, wherein the method further comprises: monitoring a reaction by the human recipient to the communicated conversational text; and using the monitored reaction to update the user profile.

14. The method of claim 10, wherein determining the confidence level comprises determining the confidence level based on the acceptability of the human recipient to changes in at least one of context and meaning related to text entry errors as provided in the user profile.

15. A computer-readable medium containing a computer-readable code that when read by a computer causes the computer to perform a method for injecting context appropriate errors into conversational text generated by conversational agents, the method comprising:

using a conversational agent to receive an original conversational text;

using the conversational agent to modify the original conversational text an imperfect conversational text, wherein the modifying the original conversational text includes adding at least one text error to the conversational text;

determining a confidence level that at least one of context and meaning of the imperfect conversational text is consistent with the context and meaning of the original conversational text; and communicating the imperfect conversational text to a human recipient if the confidence level is above a pre-defined threshold.

16. The computer-readable medium of claim 15, wherein the method further comprises using at least one of previous conversational agent generated text, previous human recipient generated text, human recipient demographic data, human recipient cultural data and human recipient feedback to generate a user profile for the human recipient comprising an acceptability of the human recipient to changes in at least one of context and meaning related to specific text entry errors.

17. The computer-readable medium of claim 16, wherein the method further comprises:

monitoring a reaction by the human recipient to the communicated conversational text; and using the monitored reaction to update the user profile.

18. The computer-readable medium of claim 16, wherein determining the confidence level comprises determining the confidence level based on the acceptability of the human recipient to changes in at least one of context and meaning related to text entry errors as provided in the user profile.

19. A system for injecting context appropriate errors into conversational text generated by conversational agents, the system comprising:

a database storing user profiles for human recipients, each user profile comprising an acceptability of a human recipient to changes in at least one of context and meaning related to specific text entry errors found in conversational text; and a conversational agent executing on a computing system, the conversational agent generating and exchanging conversational text with human recipients and comprising:

a text error injection module to modify an original conversational text an imperfect conversational text, wherein the conversational agent receives the original conversational text, wherein the modifying the original conversational text includes adding at least one text error to the conversational text, ;

a natural language processing module in communication with the text error injection module and the database to determine a confidence level that at least one of context and meaning of the imperfect conversational text is consistent with the context and meaning of the original conversational text based on the acceptability of a given human recipient to changes in at least one of the context and the meaning related to text entry errors as provided in the user profile associated with the given human recipient; and an input and output module executing on the computing system and in communication with the text error injection module and natural language processing module to communicate the imperfect conversational text to the given human recipient if the confidence level is above a pre-defined threshold.

20. The system of claim 19, wherein the system further comprises:

a user profile generation module in communication with the database, the user profile generation module using at least one of previous conversational agent generated text, previous human recipient generated text, human recipient demographic data, human recipient cultural data and human recipient feedback to generate user profiles for the human recipients; and a monitoring module executing on the computing system and in communication with the database to monitor conversational text exchanges between the conversational agent and human recipients to monitor a reaction by the given human recipient to the communicated conversational text and to use the monitored reaction to update the user profile.

* * * * *